United States Patent
Cai

(10) Patent No.: US 10,336,434 B2
(45) Date of Patent: *Jul. 2, 2019

(54) SINGLE-SHAFT AERIAL VEHICLE

(71) Applicant: GoerTek Technology Co., Ltd., Qingdao, Shandong Province (CN)

(72) Inventor: Zhongyu Cai, Qingdao (CN)

(73) Assignee: GOERTEK TECHNOLOGY CO., Ltd., Qingdao, Shandong Province (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/066,178

(22) PCT Filed: Dec. 20, 2016

(86) PCT No.: PCT/CN2016/111145
§ 371 (c)(1),
(2) Date: Jun. 26, 2018

(87) PCT Pub. No.: WO2017/114244
PCT Pub. Date: Jul. 6, 2017

(65) Prior Publication Data
US 2019/0009885 A1    Jan. 10, 2019

(30) Foreign Application Priority Data
Dec. 31, 2015   (CN) .......................... 2015 1 1033097

(51) Int. Cl.
B64C 9/00       (2006.01)
B64C 27/10      (2006.01)
(Continued)

(52) U.S. Cl.
CPC ................ B64C 9/00 (2013.01); B64C 27/10 (2013.01); B64C 27/82 (2013.01); B64D 27/24 (2013.01); B64C 2027/8272 (2013.01)

(58) Field of Classification Search
CPC ......... B64C 27/06; B64C 27/08; B64C 27/10; B64C 27/82; B64C 2027/8263;
(Continued)

(56) References Cited

U.S. PATENT DOCUMENTS 4,162,053 A * 7/1979 Bjornson ............... B64D 19/02
                                                          102/339
4,478,379 A * 10/1984 Kerr ........................ B64C 27/10
                                                          244/120
(Continued)

FOREIGN PATENT DOCUMENTS

CN          2741869        11/2005
CN         101492093        7/2009
(Continued)

OTHER PUBLICATIONS

PCT/CN2016/111145, International Written Opinion dated Mar. 8, 2017, 5 pages and English Translation, 4 pages.
(Continued)

Primary Examiner — Joseph W Sanderson
(74) Attorney, Agent, or Firm — Boyle Fredrickson, S.C

(57) ABSTRACT

A single-shaft aerial vehicle comprises a propeller, an aerial vehicle body and a wing driver unit constituting a portion of the aerial vehicle body. The aerial vehicle body has a streamlined shape. A ring-shaped wing extending out of the wing driver unit is provided at a central position of the wing driver unit. The ring-shaped wing is movable horizontally under the drive of the wing drive unit. When drag areas of the ring-shaped wing extending out of an outer circumference of the wing drive unit are the same in all directions, the single-shaft aerial vehicle maintains its current flying posture. When the ring-shaped wing moves toward a certain direction to increase the drag area extending out of the wing drive unit in the certain direction, and contracts into the wing drive unit in its opposite direction to reduce the drag area in
(Continued)

the opposite direction, the single-shaft aerial vehicle changes its current flying posture.

8 Claims, 5 Drawing Sheets

(51) Int. Cl.
    *B64C 27/82*     (2006.01)
    *B64D 27/24*     (2006.01)

(58) Field of Classification Search
    CPC ............ B64C 2027/8272; B64C 39/06; B64C 39/062; B64C 2201/024; B64D 19/00; B64D 19/02
    See application file for complete search history.

(56) References Cited

U.S. PATENT DOCUMENTS

| | | | | |
|---|---|---|---|---|
| 7,789,341 | B2 * | 9/2010 | Arlton | B64C 27/10 |
| | | | | 244/17.23 |
| 8,690,105 | B2 * | 4/2014 | Liao | B64D 17/14 |
| | | | | 244/142 |
| 9,981,744 | B2 * | 5/2018 | Choo | B64C 39/028 |
| 10,054,939 | B1 * | 8/2018 | Applewhite | B64F 1/04 |
| 10,093,417 | B2 * | 10/2018 | Meringer | B64C 27/10 |
| 2005/0051667 | A1 * | 3/2005 | Arlton | B64C 27/10 |
| | | | | 244/17.11 |

FOREIGN PATENT DOCUMENTS

| | | | | |
|---|---|---|---|---|
| CN | 202464123 | | 10/2012 | |
| CN | 103171765 | | 6/2013 | |
| CN | 203402385 | | 1/2014 | |
| CN | 105129088 | | 12/2015 | |
| CN | 105480406 | | 4/2016 | |
| CN | 105539830 | | 5/2016 | |
| CN | 205554564 | | 9/2016 | |
| CN | 205554581 | | 9/2016 | |
| GB | 576125 | | 3/1946 | |
| GB | 1112924 | | 5/1968 | |
| JP | 2015-123961 | | 7/2015 | |
| WO | WO-2017114245 A1 * | | 7/2017 | ............ B64C 27/10 |

OTHER PUBLICATIONS

CN Appln. No. 201511033097.7, First Office Action dated Feb. 22. 2017, 5 pages and English Translation, 6 pages.

* cited by examiner

SINGLE-SHAFT AERIAL VEHICLE

CROSS REFERENCE TO RELATED APPLICATIONS

This application is a National Stage entry of International Application No. PCT/CN2016/111145, filed on Dec. 20, 2016, which claims priority to Chinese Patent Application No. 201511033097.7, filed on Dec. 31, 2015. The disclosure of the priority applications are hereby incorporated in their entirety by reference.

TECHNICAL FIELD

The present disclosure relates to the technical field of aerial vehicle design, and particularly relates to a single-shaft aerial vehicle.

BACKGROUND

Traditional consumer aerial vehicles that can take off and land vertically can be generally classified into two types: multi-axis multi-propeller aerial vehicles and single-axis multi-propeller aerial vehicles. The single-axis multi-propeller aerial vehicle controls the flying posture of the aerial vehicle in the following two ways:

First, multiple groups of propellers are provided, and the angles of the propellers are changed so that the angles of each group of the propellers are different. The flying posture of the aerial vehicle is controlled by changing the directions of the downward winds generated by each group of the propellers. The structure of such kind of single-axis multi-propeller aerial vehicle is complicated, and it is difficult to control the angles of the propellers, so it is rare in consumer products.

Second, an empennage structure is provided so as to change the flying posture by driving the propeller on the empennage. The single-axis multi-propeller aerial vehicle with such a structure has a simple structure and is widely used in the market, but its appearance and shape are monotonous.

SUMMARY

In view of the above problems, the present disclosure provides a single-shaft aerial vehicle to solve the problems of traditional single-shaft multi-propeller aerial vehicles that the structure is complicated, it is difficult to control the angle of the propellers, and the appearance and shape are monotonous.

To achieve the object, the technical solutions of the present disclosure are as follows:

An embodiment of the present disclosure provides a single-shaft aerial vehicle, comprising a propeller 1 and an aerial vehicle body 2, wherein the aerial vehicle body 2 has a streamlined shape, a drive motor is provided in the aerial vehicle body 2, the drive motor is configured to drive the propeller 1 to rotate and provide the aerial vehicle body 2 with an ascending power;

the single-shaft aerial vehicle further comprises a wing drive unit 3 constituting part of the aerial vehicle body 2;

a ring-shaped wing 4 extending out of the wing drive unit 3 is provided at a central position of the wing drive unit 3, and the ring-shaped wing 4 is movable horizontally under the drive of the wing drive unit 3;

when drag areas of the ring-shaped wing 4 extending out of an outer circumference of the wing drive unit 3 are the same in all directions, the single-shaft aerial vehicle maintains its current flying posture; and when the ring-shaped wing 4 moves toward a certain direction to increase the drag area extending out of the wing drive unit 3 in the certain direction, and contracts into the wing drive unit 3 in its opposite direction to reduce the drag area in the opposite direction, the single-shaft aerial vehicle changes its current flying posture.

In some embodiments, the wing drive unit 3 comprises a cylindrical magnetic ring 31, an electromagnetic motor 32, an upper cover 33 and a lower cover 34, and the ring-shaped wing 4 and the outer wall of the cylindrical magnetic ring 31 are integrally formed;

the cylindrical magnetic ring 31 is sleeved on the outer periphery of the electromagnetic motor 32, and they have a same height and are separated by a certain annular distance;

the electromagnetic motor 32 is fixed between the upper cover 33 and the lower cover 34, a space is reserved between the upper cover 33 and the lower cover 34 through which the ring-shaped wing 4 extends outward, and part of the ring-shaped wing 4 extends outside the aerial vehicle body 2 through the space formed by the upper cover 33 and the lower cover 34;

when the current flying posture is maintained, the magnetic field of the electromagnetic motor 32 is uniformly distributed and repels the polarity of the cylindrical magnetic ring 31, and the axial center of the cylindrical magnetic ring 31 coincides with the axial center of the electromagnetic motor 32; and when the current flying posture is to be changed, the operating current flowing in the electromagnetic motor 32 in a certain direction is changed to change the magnetic field of the electromagnetic motor 32, and the axial center of the cylindrical magnetic ring 31 shifts under the action of the magnetic field of the electromagnetic motor 32, and the ring-shaped wing 4 is driven to move horizontally.

In some embodiments, the upper cover 33 and the lower cover 34 have a same structure and both comprise a screw base 35 located at a central position and supporting columns 36 located around the screw base 35; and both ends of the electromagnetic motor 32 have a screw head 321 fitting with the screw base 35, and the upper cover 33 and the lower cover 34 are tightly fixed by the fitting of the screw head 321 at both ends of the electromagnetic motor 32 and the screw base 35.

In some embodiments, the aerial vehicle body 2 comprises a nose 21, a fuselage 22, and a tail 23; and the wing drive unit 3 is disposed between the nose 21 and the fuselage 22, or, the wing drive unit 3 is disposed between the fuselage 22 and the tail 23.

In some embodiments, a control circuit board and a battery are disposed in the fuselage 22;

the control circuit board is configured to control the operation of the single-shaft aerial vehicle; and the battery is configured to supply power to the control circuit board, the drive motor and the wing drive unit 3.

In some embodiments, a distance measuring module is disposed in the tail 23;

the distance measuring module is connected to the control circuit board through a flexible circuit board, and is configured to measure the real-time flying height of the single-shaft aerial vehicle and send the measured flying height information to the control circuit board; and the control circuit board is configured to control the rotational speed of the drive motor according to the received flying height information.

In some embodiments, the single-shaft aerial vehicle further comprises a balance rod 5; and the balance rod 5 is located at the front end of the propeller 1, and is configured to maintain the stability of the single-shaft aerial vehicle when it hovers in the air.

In some embodiments, the single-shaft aerial vehicle further comprises a support frame 6; and the support frame 6 is disposed outside the tail 23 and is configured to carry a carrier 7.

The advantageous effects of the embodiment of the present disclosure are as follows.

First, the wing drive unit is introduced into the single-shaft aerial vehicle body, so that based on the principle of changing the drag by the wing, when the single-shaft aerial vehicle needs to maintain the current flying posture, drag areas of the parts of the ring-shaped wing extending out of the aerial vehicle body under the drive of the wing drive unit are the same in all directions, thereby ensuring that the downward pushing force of the single-shaft aerial vehicle is uniform to maintain the current flying posture. On the other hand, when the single-shaft aerial vehicle needs to change the flying posture, the wing drive unit drives the ring-shaped wing to move toward a certain direction, and the drag area extending out of the single-shaft aerial vehicle body in the certain direction is relatively increased, thereby causing the downward pushing force of the single-shaft aerial vehicle uneven and further changing the fuselage angle to change the current flying posture. In other words, the principle of controlling the flying posture of the single-shaft aerial vehicle of the present disclosure is simple and easy to realize.

Second, when the current flying posture of the single-shaft aerial vehicle needs to be changed, the flying posture may be changed merely by changing the operating current in a certain direction of the electromagnetic motor in the wing drive unit. In other words, the operation mode of the present disclosure is simple and convenient.

Third, the single-shaft aerial vehicle of the present disclosure, as a whole, is composed of only two parts: a propeller and a streamlined aerial vehicle body. Its structure is simple, and its appearance is beautiful.

Figure 1:
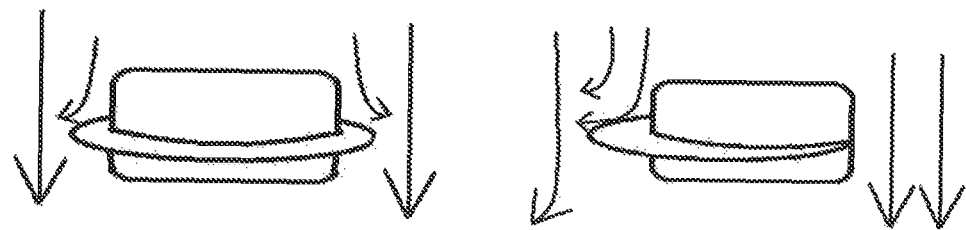
FIG. 1 is a schematic diagram of the principle of changing a flying posture of a single-shaft aerial vehicle according to an embodiment of the present disclosure.

In the drawings, 1: propeller; 2: aerial vehicle body; 21: nose; 22: fuselage; 23: tail; 3: wing drive unit; 31: cylindrical magnetic ring; 32: electromagnetic motor; 321: screw head; 33: upper cover; 34: lower cover; 35: screw base; 36: supporting column; 4: ring-shaped wing; 5: balance rod; 6: support frame; 7: carrier.

DETAILED DESCRIPTION

In order to make the objects, technical solutions and advantages of the present disclosure clearer, the embodiments of the present disclosure will be described below in further detail in conjunction with the drawings.

The general inventive concept of the present disclosure is as follows. Referring to FIG. 1, by taking advantage of the principle of changing the drag by the wing, the wing drive unit is introduced into the single-shaft aerial vehicle body. As shown in the left drawing of FIG. 1, under normal circumstances, drag areas of the parts of the wing extending out of the single-shaft aerial vehicle body are the same in all directions, so although the wing produces drag, the downward pushing force of the single-shaft aerial vehicle is uniform since drag areas are small and equal. As shown in the right drawing of FIG. 1, when the wing moves toward a certain direction, it will contract into the single-shaft aerial vehicle body in its opposite direction, and the drag area extending out of the aerial vehicle body in the certain direction is relatively increased, thereby causing the downward pushing force of the single-shaft aerial vehicle uneven and further changing the fuselage angle, so as to realize the control on the flying posture of the single-shaft aerial vehicle.

Figure 2:
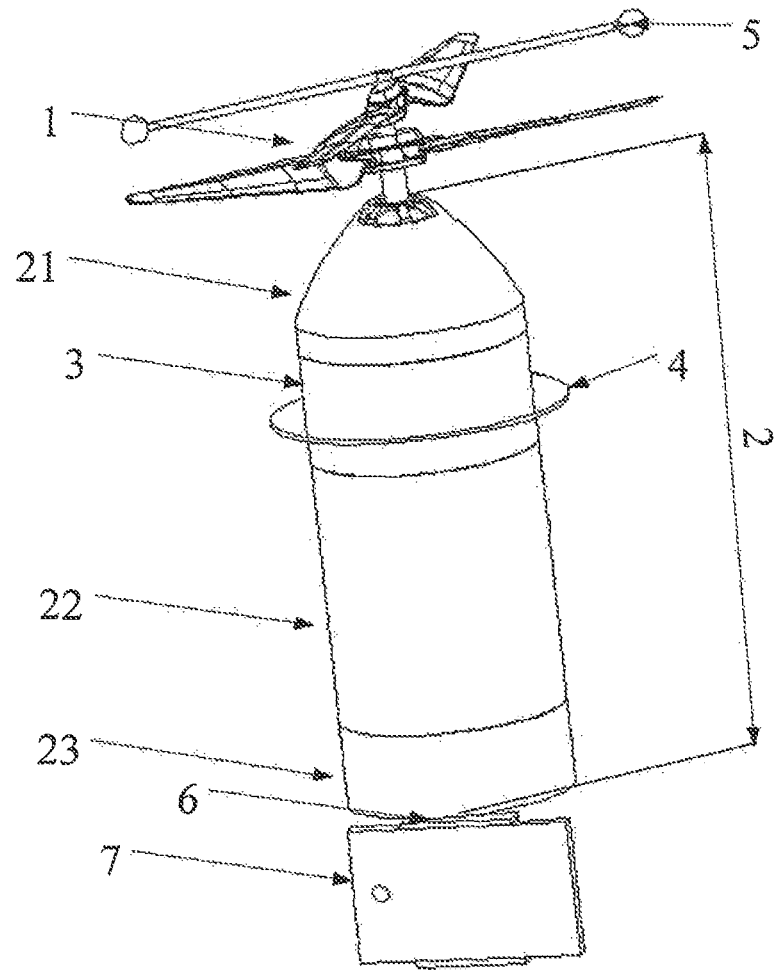
FIG. 2 is a schematic view of the appearance of a single-shaft aerial vehicle according to an embodiment of the present disclosure.

FIG. 2 is a schematic view of the appearance of a single-shaft aerial vehicle according to an embodiment of the present disclosure. As shown in FIG. 2, the single-shaft aerial vehicle comprises a propeller 1 and an aerial vehicle body 2. The aerial vehicle body 2 has a streamlined shape, and a drive motor is provided therein. The drive motor is configured to drive the propeller 1 to rotate and provide the aerial vehicle body 2 with an ascending power.

The single-shaft aerial vehicle further comprises a wing drive unit 3 constituting part of the aerial vehicle body 2.

A ring-shaped wing 4 extending out of the wing drive unit 3 is provided at the central position of the wing drive unit 3. The ring-shaped wing 4 is movable horizontally under the drive of the wing drive unit 3.

When drag areas of the ring-shaped wing 4 extending out of an outer circumference of the wing drive unit 3 are the same in all directions, the single-shaft aerial vehicle maintains the current flying posture.

When the ring-shaped wing 4 moves toward a certain direction to increase the drag area extending out of the wing drive unit 3 in the certain direction, and contracts into the wing drive unit 3 in its opposite direction to reduce the drag area in the opposite direction, the single-shaft aerial vehicle changes its current flying posture.

In some embodiments, the wing drive unit is introduced into the single-shaft aerial vehicle body, so that based on the principle of changing the drag by the wing, when the single-shaft aerial vehicle needs to maintain the current flying posture, drag areas of the parts of the ring-shaped wing extending out of the aerial vehicle body under the drive of the wing drive unit are the same in all directions, thereby ensuring that the downward pushing force of the single-shaft aerial vehicle is uniform to maintain the current flying posture. On the other hand, when the single-shaft aerial vehicle needs to change the flying posture, the wing drive unit drives the ring-shaped wing to move toward a certain direction, and the drag area extending out of the single-shaft aerial vehicle body in the certain direction is relatively increased, thereby causing the downward pushing force of the single-shaft aerial vehicle uneven and further changing the fuselage angle, which changes the current flying posture.

Figure 3:
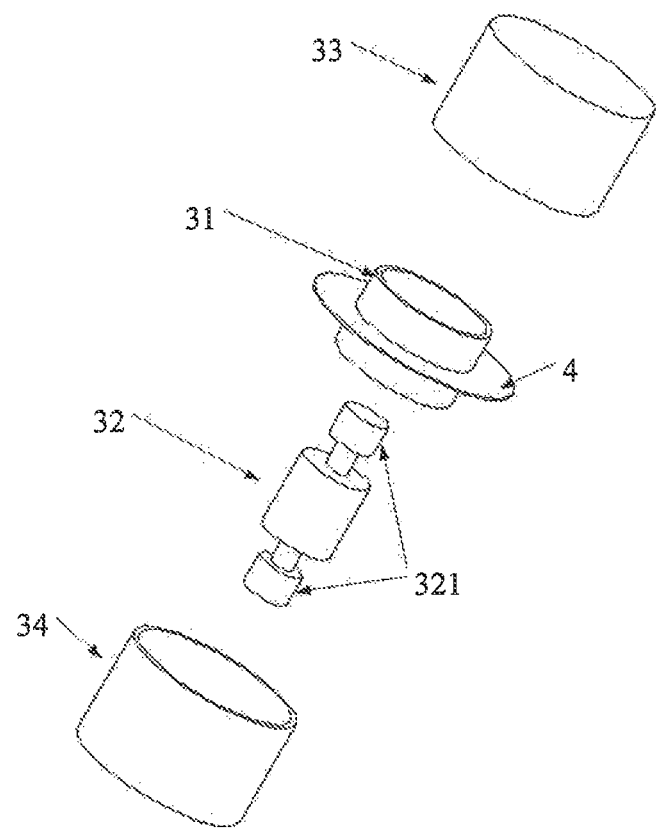
FIG. 3 is an exploded view of a wing drive unit according to an embodiment of the present disclosure.
Figure 4:
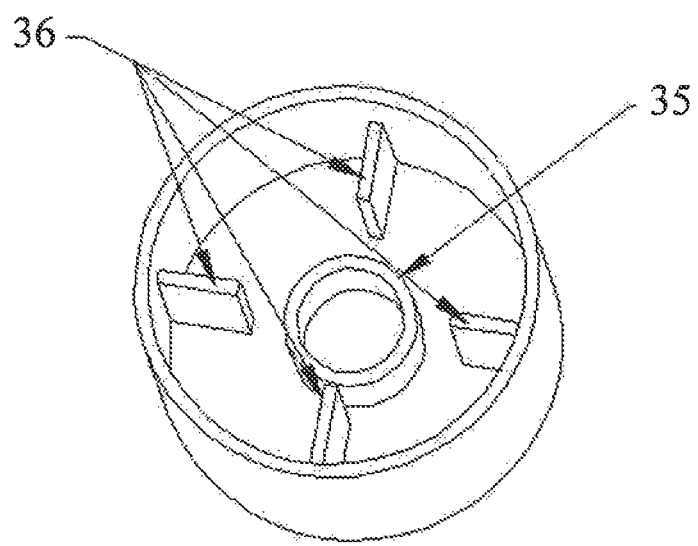
FIG. 4 is a schematic view of the structure of an upper cover of the wing drive unit in FIG. 3.
Figure 5:
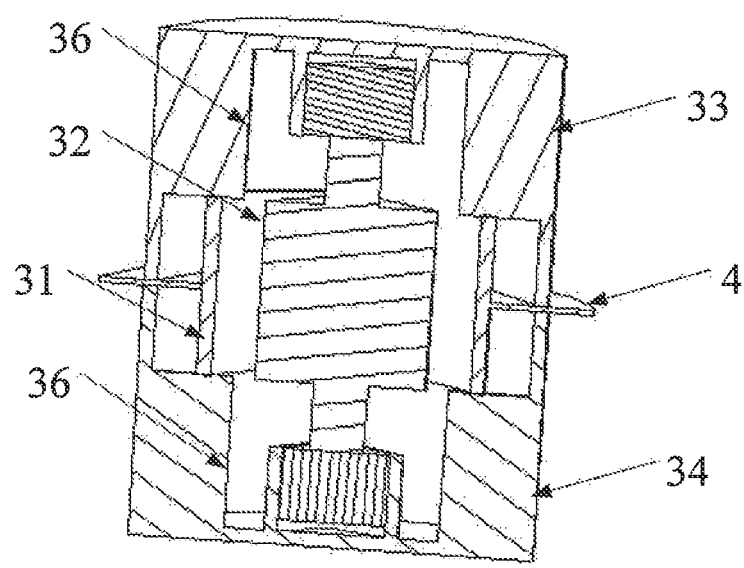
FIG. 5 is a schematic sectional view of the wing drive unit in FIG. 3.

In some embodiments, as jointly shown in FIGS. 3 to 5, the wing drive unit 3 comprises a cylindrical magnetic ring 31, an electromagnetic motor 32, an upper cover 33 and a lower cover 34. The ring-shaped wing 4 and the outer wall of the cylindrical magnetic ring 31 are integrally formed.

The cylindrical magnetic ring 31 is sleeved on the outer periphery of the electromagnetic motor 32, and they have the same height and are separated by a certain annular distance so as to facilitate the small-scale movement of the cylindrical magnetic ring 31.

The electromagnetic motor 32 is fixed between the upper cover 33 and the lower cover 34, and a space is reserved between the upper cover 33 and the lower cover 34 through which the ring-shaped wing 4 extends outward. Part of the ring-shaped wing 4 extends outside the aerial vehicle body 2 through the space formed by the upper cover 33 and the lower cover 34.

Figure 6A:
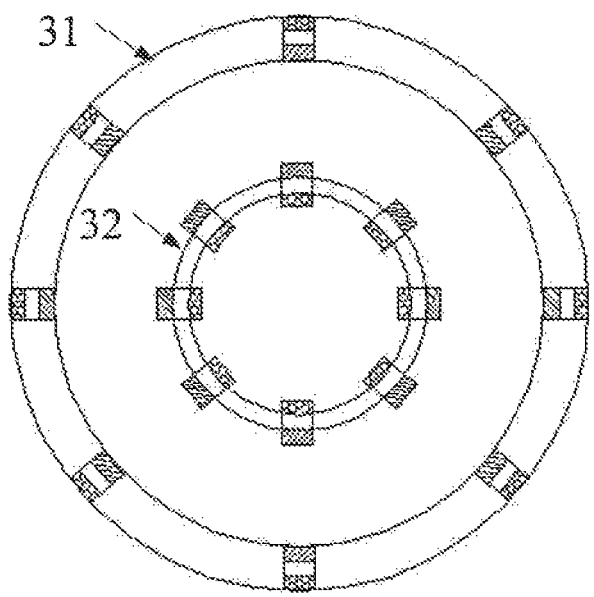
FIG. 6*a* is a schematic diagram of the magnetic field of an electromagnetic motor when the axial center of a cylindrical magnetic ring of the wing drive unit in FIG. 3 coincides with the axial center of the electromagnetic motor.
Figure 7A:
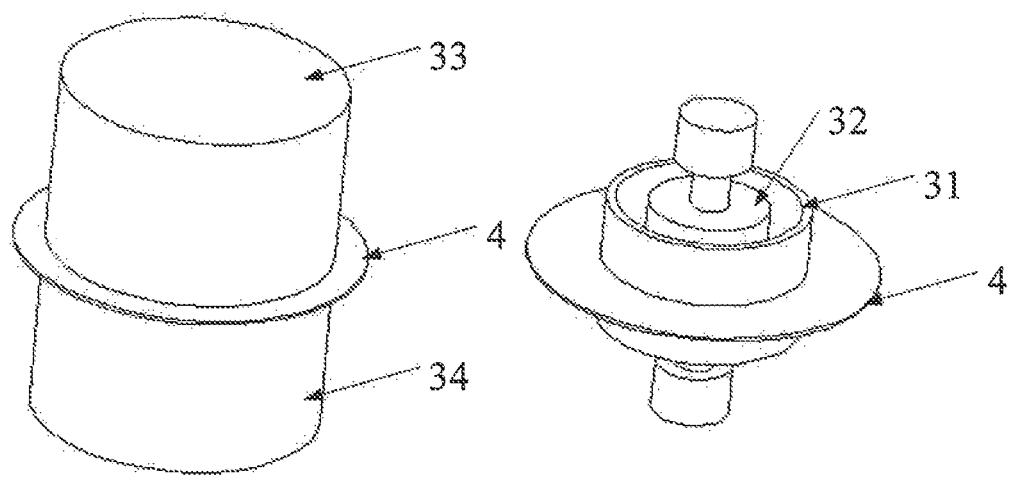
FIG. 7*a* is a schematic diagram of the drag area of a ring-shaped wing when the axial center of the cylindrical magnetic ring of the wing drive unit coincides with the axial center of the electromagnetic motor according to an embodiment of the present disclosure.

When the current flying posture is maintained, the magnetic field of the electromagnetic motor 32 is uniformly distributed and repels the polarity of the cylindrical magnetic ring 31, and the axial center of the cylindrical magnetic ring 31 coincides with the axial center of the electromagnetic motor 32. As shown in FIG. 6a, when the electromagnetic motor 32 operates in the normal way, the outer surface of the electromagnetic motor 32 and the inner surface of the cylindrical magnetic ring 31 have the same magnetism. Since the magnetic fields of the cylindrical magnetic ring 31 and the electromagnetic motor 32 are distributed uniformly, the repulsive forces applied on the cylindrical magnetic ring 31 are the same in all directions, so that its axial center coincides with the axial center of the electromagnetic motor 32. As shown in FIG. 7a, when the axial center of the cylindrical magnetic ring 31 coincides with the axial center of the electromagnetic motor 32, drag areas of the parts of the ring-shaped wing 4 extending out of the aerial vehicle body 2 are the same in all directions, and the downward pushing force of the single-shaft aerial vehicle is uniform, thus the single-shaft aerial vehicle can maintain its current flying posture.

Figure 6B:
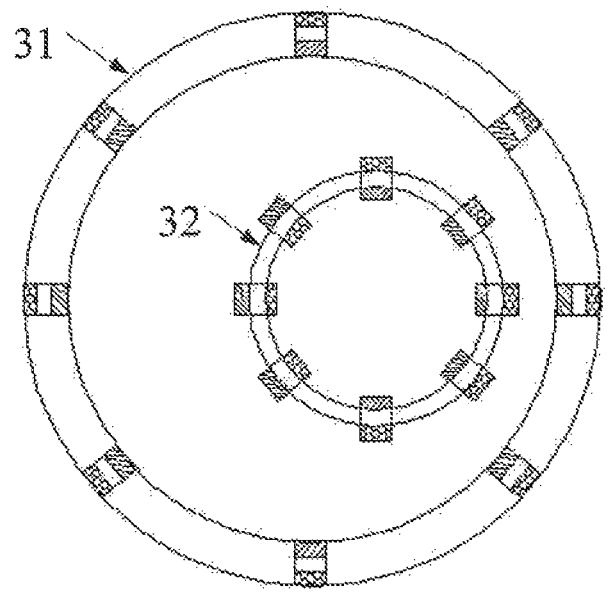
FIG. 6*b* is a schematic diagram of the magnetic field of the electromagnetic motor when the axial center of the cylindrical magnetic ring of the wing drive unit in FIG. 3 is shifted leftward with respect to the electromagnetic motor.
Figure 7B:
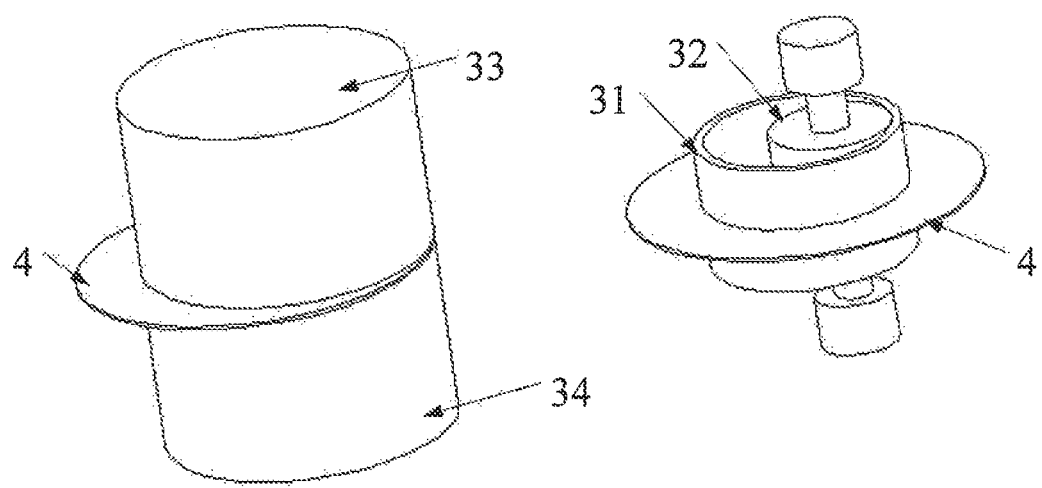
FIG. 7*b* is a schematic diagram of the drag area of the ring-shaped wing when the axial center of the cylindrical magnetic ring of the wing drive unit is shifted leftward with respect to the electromagnetic motor according to an embodiment of the present disclosure.

When the current flying posture is to be changed, the operating current flowing in the electromagnetic motor 32 in a certain direction is changed to change the magnetic field of the electromagnetic motor 32. The axial center of the cylindrical magnetic ring 31 shifts under the action of the magnetic field of the electromagnetic motor 32, and the ring-shaped wing 4 is driven to move horizontally. As shown in FIG. 6b, if the ring-shaped wing 4 is to be driven to move leftward, the direction of the operating current on the right side of the electromagnetic motor 32 may be changed to change the magnetic polarity on the right side of the electromagnetic motor 32, and the axial center of the cylindrical magnetic ring 31 is attracted to move leftward. As shown in FIG. 7b, when the axial center of the cylindrical magnetic ring 31 is shifted leftward with respect to the axial center of the electromagnetic motor 32, the drag area of the ring-shaped wing 4 extending out of the left side of the aerial vehicle body 2 increases relatively, a leftward drag generates on the single-shaft aerial vehicle, and the aerial vehicle body of the single-shaft aerial vehicle is shifted leftward so that the single-shaft aerial vehicle can change the current flying posture.

Figure 7C:
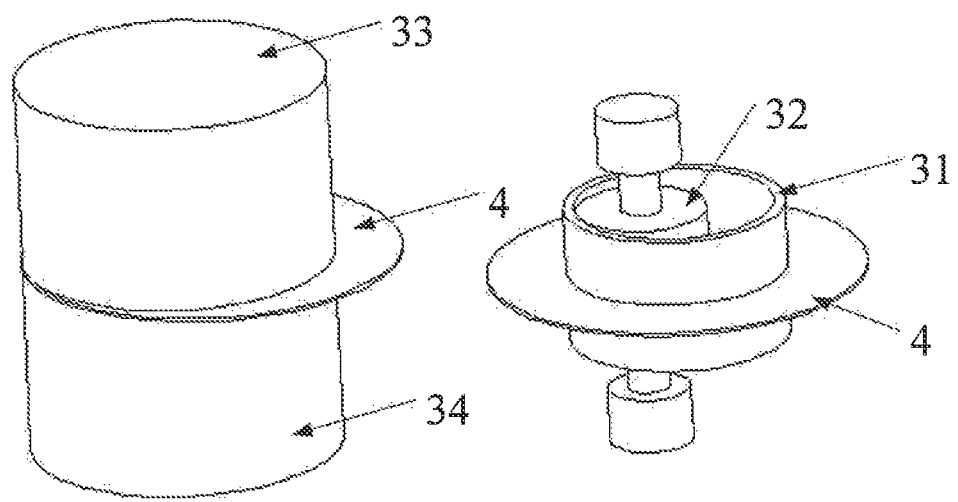
FIG. 7*c* is a schematic diagram of the drag area of the ring-shaped wing when the axial center of the cylindrical magnetic ring of the wing drive unit is shifted rightward with respect to the electromagnetic motor according to an embodiment of the present disclosure.

When the aerial vehicle body of the single-shaft aerial vehicle needs to shift rightward, the direction of the operating current on the left side of the electromagnetic motor 32 may be changed to change the magnetic polarity on the left side of the electromagnetic motor 32 and attract the axial center of the cylindrical magnetic ring 31 to move rightward. As shown in FIG. 7c, when the axial center of the cylindrical magnetic ring 31 is shifted rightward with respect to the axial center of the electromagnetic motor 32, the drag area of the ring-shaped wing 4 extending out of the right side of the aerial vehicle body 2 increases relatively, a rightward drag generates on the single-shaft aerial vehicle, and the aerial vehicle body of the single-shaft aerial vehicle is shifted rightward.

The upper cover 33 and the lower cover 34 have the same structure. As shown in FIG. 4, the upper cover 33 and the lower cover 34 both comprise a screw base 35 located at a central position and supporting columns 36 located around the screw base 35.

As shown in FIG. 5, both ends of the electromagnetic motor 32 have a screw head 321 fitting with the screw base 35. The upper cover 33 and the lower cover 34 are tightly fixed by the fitting of the screw head 321 at both ends of the electromagnetic motor 32 and the screw base 35, and limit the cylindrical magnetic ring 31 vertically to prevent the cylindrical magnetic ring 31 from moving up and down.

In another embodiment, the aerial vehicle body 2 comprises a nose 21, a fuselage 22 and a tail 23.

In some embodiments, the wing drive unit 3 may be disposed between the nose 21 and the fuselage 22, or may be disposed between the fuselage 22 and the tail 23.

A control circuit board and a battery are provided in the fuselage 22. The control circuit board is configured to control the operation of the single-shaft aerial vehicle. The battery is configured to supply power to the control circuit board, the drive motor and the wing drive unit.

A distance measuring module is disposed in the tail 23. The distance measuring module is connected to the control circuit board through a flexible circuit board, and is configured to measure the real-time flying height of the single-shaft aerial vehicle and send the measured flying height information to the control circuit board. The control circuit board controls the rotational speed of the drive motor according to the received flying height information.

As shown in FIG. 2, the single-shaft aerial vehicle further comprises a balance rod 5 and a support frame 6. The balance rod 5 is located at the front end of the propeller 1, and is configured to maintain the stability of the single-shaft aerial vehicle when it hovers in the air. The support frame 6 is disposed outside of the tail 23 and is configured to carry a carrier 7. The carrier 7 may be a device such as a mobile phone and a PAD.

In summary, the present disclosure provides a single-shaft aerial vehicle having the following advantageous effects:

First, the wing drive unit is introduced into the single-shaft aerial vehicle body, so that based on the principle of changing the drag by the wing, when the single-shaft aerial vehicle needs to maintain the current flying posture, drag areas of the parts of the ring-shaped wing extending out of the aerial vehicle body under the drive of the wing drive unit are the same in all directions, thereby ensuring that the downward pushing force of the single-shaft aerial vehicle is uniform to maintain the current flying posture. On the other hand, when the single-shaft aerial vehicle needs to change the flying posture, the wing drive unit drives the ring-shaped wing to move toward a certain direction, and the drag area extending out of the single-shaft aerial vehicle body in the certain direction is relatively increased, thereby causing the downward pushing force of the single-shaft aerial vehicle uneven and further changing the fuselage angle to change the current flying posture. In other words, the principle of controlling the flying posture of the single-shaft aerial vehicle of the present disclosure is simple and easy to realize.

Second, when the current flying posture of the single-shaft aerial vehicle needs to be changed, the flying posture may be changed merely by changing the operating current in a certain direction of the electromagnetic motor in the wing drive unit. In other words, the operation mode of the present disclosure is simple and convenient.

Third, the single-shaft aerial vehicle of the present disclosure, as a whole, is composed of only two parts: a propeller and a streamlined aerial vehicle body. Its structure is simple, and its appearance is beautiful.

The above description is merely preferable embodiments of the present disclosure, and is not intended to limit the protection scope of the present disclosure. Any modification, equivalent substitution, improvement, etc. made within the spirit and principle of the present disclosure shall be included in the protection scope of the present disclosure.

What is claimed is:

1. A single-shaft aerial vehicle, comprising a propeller and an aerial vehicle body, wherein the aerial vehicle body has a streamlined shape, a drive motor is provided in the aerial vehicle body, the drive motor is configured to drive the propeller to rotate and provide the aerial vehicle body with an ascending power, wherein
   the single-shaft aerial vehicle further comprises a wing drive unit constituting part of the aerial vehicle body;
   a ring-shaped wing extending out of the wing drive unit is provided at a central position of the wing drive unit, and the ring-shaped wing is movable horizontally under the drive of the wing drive unit;
   when drag areas of the ring-shaped wing extending out of an outer circumference of the wing drive unit are the same in all directions, the single-shaft aerial vehicle maintains its current flying posture; and
   when the ring-shaped wing moves toward a certain direction to increase the drag area extending out of the wing drive unit in the certain direction, and contracts into the wing drive unit in an opposite direction to reduce the drag area in the opposite direction, the single-shaft aerial vehicle changes its current flying posture.

2. The single-shaft aerial vehicle according to claim 1, wherein the wing drive unit comprises a cylindrical magnetic ring, an electromagnetic motor, an upper cover and a lower cover, and the ring-shaped wing and an outer wall of the cylindrical magnetic ring are integrally formed;
   the cylindrical magnetic ring is sleeved on an outer periphery of the electromagnetic motor, and the cylindrical magnetic ring and the electromagnetic motor have a same height and are separated by a certain annular distance;
   the electromagnetic motor is fixed between the upper cover and the lower cover, a space is reserved between the upper cover and the lower cover through which the ring-shaped wing extends outward, and part of the ring-shaped wing extends outside the aerial vehicle body through the space formed by the upper cover and the lower cover;
   when the current flying posture is maintained, a magnetic field of the electromagnetic motor is uniformly distributed and repels the polarity of the cylindrical magnetic ring, and an axial center of the cylindrical magnetic ring coincides with an axial center of the electromagnetic motor; and
   when the current flying posture is to be changed, an operating current flowing in the electromagnetic motor in a certain direction is changed to change the magnetic field of the electromagnetic motor, and the axial center of the cylindrical magnetic ring shifts under the action of the magnetic field of the electromagnetic motor, and the ring-shaped wing is driven to move horizontally.

3. The single-shaft aerial vehicle according to claim 2, wherein the upper cover and the lower cover both comprise a screw base located at a central position and supporting columns located around the screw base;
   the electromagnetic motor has first and second ends; and
   the first and second ends of the electromagnetic motor have a screw head fitting with the screw base, and the upper cover and the lower cover are fixed by the fitting of the screw head at both ends of the electromagnetic motor and the screw base.

4. The single-shaft aerial vehicle according to claim 2, wherein the aerial vehicle body comprises a nose, a fuselage and a tail in sequence; and
   the wing drive unit is disposed between the nose and the fuselage, or, the wing drive unit is disposed between the fuselage and the tail.

5. The single-shaft aerial vehicle according to claim 4, wherein a control circuit board and a battery are disposed in the fuselage;
   the control circuit board is configured to control the operation of the single-shaft aerial vehicle; and
   the battery is configured to supply power to the control circuit board, the drive motor and the wing drive unit.

6. The single-shaft aerial vehicle according to claim 5, wherein a distance measuring module is disposed in the tail;
   the distance measuring module is connected to the control circuit board through a flexible circuit board, and is configured to measure the real-time flying height of the single-shaft aerial vehicle and send measured flying height information to the control circuit board; and
   the control circuit board is configured to control the rotational speed of the drive motor according to received flying height information.

7. The single-shaft aerial vehicle according to claim 4, wherein the single-shaft aerial vehicle further comprises a balance rod; and
   the balance rod is located above the propeller, and is configured to maintain the stability of the single-shaft aerial vehicle when it hovers in the air.

8. The single-shaft aerial vehicle according to claim 4, further comprising a support frame; and the support frame is disposed outside the tail and is configured to carry a carrier.

\* \* \* \* \*